United States Patent [19]

Pedersen

[11] 4,283,071

[45] Aug. 11, 1981

[54] ADJUSTABLE LENGTH COUPLING FOR TOWING AND LIFTING A TRACTOR DRAWN IMPLEMENT

[75] Inventor: Jens S. Pedersen, Nrhyndelse, Denmark

[73] Assignee: A/S Plovfabrikken Fraugde, Fraugde, Denmark

[21] Appl. No.: 63,448

[22] Filed: Aug. 3, 1979

[30] Foreign Application Priority Data

Aug. 5, 1978 [GB] United Kingdom ............... 32385/78

[51] Int. Cl.³ .................. A01B 59/043; A01B 63/102; A01B 73/00
[52] U.S. Cl. ................................. 280/415 A; 172/248; 172/449; 172/450; 280/446 A; 280/456 A; 280/460 A
[58] Field of Search ............... 172/439, 248, 449, 450; 280/415 A, 446 A, 474, 460 A, 461 A, 456 A, 449, 450, 451

[56] References Cited

U.S. PATENT DOCUMENTS

| 2,996,128 | 8/1961 | Gardner | 172/248 X |
| 3,195,651 | 7/1965 | Todd | 280/461 A X |
| 3,220,751 | 11/1965 | Tweedale | 280/461 A |
| 4,039,201 | 8/1977 | Huitema | 280/461 A |
| 4,073,346 | 2/1978 | Groth et al. | 172/439 |

FOREIGN PATENT DOCUMENTS 1295215  4/1962  France ..................................... 172/248

Primary Examiner—George J. Marlo
Attorney, Agent, or Firm—Craig and Antonelli

[57] ABSTRACT

A traction coupling between a tractor and an agricultural implement, capable of being easily shiftable between a towing position and a position in which the implement is mounted on the three-point-lift of the tractor. The coupling includes a traverse which is mountable between the opposed ends of the lower lift arms of the tractor lift and is provided with a rearwardly projecting towing member, which is length adjustable to alternatively permit the implement to be mounted direct behind the tractor in lift engagement with the said traverse.

15 Claims, 6 Drawing Figures

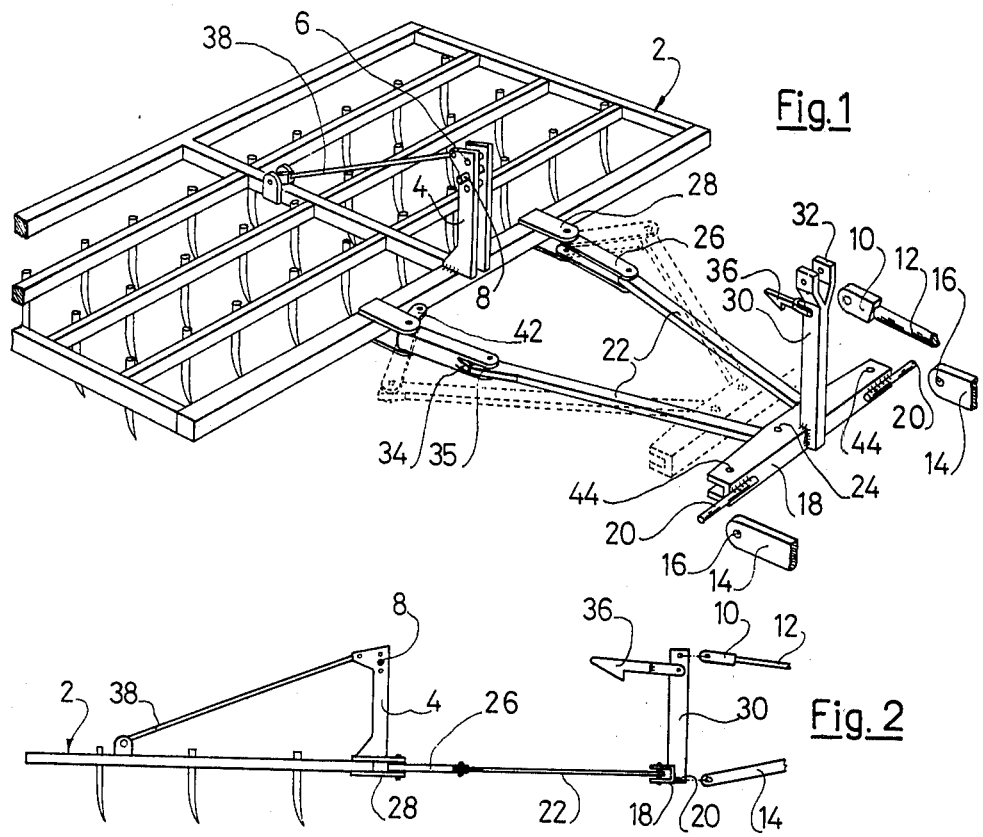
Fig. 1
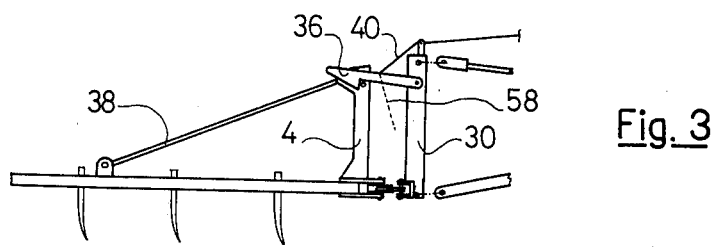
Fig. 2
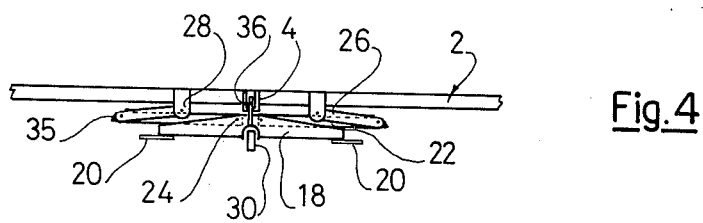
Fig. 3
Fig. 4

ADJUSTABLE LENGTH COUPLING FOR TOWING AND LIFTING A TRACTOR DRAWN IMPLEMENT

The present invention relates to a traction coupling between a tractor and an implement to be propelled by the tractor, and of the type specified in the introductory clause of claim 1.

The most common towing couplings for agricultural implements or carts comprise a towing member shaped as a simple pulling rod which is horizontally pivotally connected with a traction eye member on the rear of the tractor, whereby the implement, e.g. a cultivator, may follow the tractor in a trailer-like manner even by driving through sharp curves. Another common coupling type is the so-called lift mounting, whereby the implement is mounted in the usual three-point-lift of the tractor, such that the implement is shiftable between a lowered working position and a raised transport position, while it is otherwise to be considered as rigidly associated with the tractor at short distances therebehind.

Each of these coupling types present separate sets of advantages and disadvantages, and in the present connection it is sufficient to acknowledge that both coupling types are widely used in practice. Normally a given implement will be adapted for either one or the other of said coupling types, although it frequently happens, that in one situation of use one type could be prefered over the other and vice versa in another situation.

It has already been suggested, e.g. as disclosed in the USA Pat. No. 2,996,128, to design an implement in such a manner that it is prepared for lift mounting a.o. by comprising mounting brackets for connection with the lift arm ends of forwardly projecting pulling rods, which as a traction triangle are connectable to the tractor when it is desired to operate the implement in the towed manner. The latter connection might be established with a fixed traction eye or bracket on the tractor, but in the said specification it is suggested that the lift arms are used even for the towing connection; the known system comprises a traverse, to the middle of which the towing triangle is pivotally hinged, while the opposed ends of the traverse are provided with means enabling them to be connected with the respective lift arm ends such that the towing triangle is connected with the tractor by mounting the traverse between the opposed lift arm ends, whereby the lift arms and the traverse act as pull transfer means. The traverse and the triangle are removed when it is desired to mount the implement directly on the tractor lift system, and in that situation the implement is additionally provided with a so-called tower which is used for the connection of the implement to the usual top rod belonging to the lift system. It is possible hereby to connect the implement with the tractor in any of the said two manners and thus also to change between the respective coupling types, but an actual change requires a considerable amount of work, whereby the value of the very possibility of changing between the two coupling types is seriously diminished.

It is the purpose of this invention to provide a traction coupling which permits a very easy change between the said two types of couplings functions, and according to the invention this is obtained by designing the coupling as stated in the characterizing clause of claim 1.

The change between one coupling type and the other may then by effected without any need of mounting or demounting separate elements, since it will be sufficient to effect an adjustment of the effective length of the towing member and to utilize the said traverse not only as a towing member, but also or alternatively as a carrier element in the lift mounted position of the implement.

According to claim 2 the carrier engagement between the implement and the tractor lift may be established automatically, and also the associated pulling engagement may be automatically established when the tractor is moved rearwardly against the implement, while the same engagement is later on releasable by remote control from the tractor drivers position. Thus, a following shift to the towed mounting position of the implement may be effected simply by releasing the said engagement and driving the tractor forwardly away from the implement. The towing member may be a telescope tube or a unitary rod, which is lengthwise movable in a guide arrangement in the implement for adjustment of the effective projecting length thereof, but in a preferred system is used the arrangement claimed in claims 5-7, whereby a simple and robust coupling system is provided.

Also in the system according to the invention some connection with the top rod of the tractor lift should be utilized for stabilizing the implement in its lift mounted position, and for this purpose an arrangement as claimed in claims 3 and 4 will be advantageous in that even the connection with the top rod may be established in an easy and well defined manner when the implement is brought to carringly engage the said traverse.

In the following the invention is described in more detail with reference to the accompanying drawing, in which:

FIG. 1 is a perspective view of a harrow with a coupling system according to the invention, shown in its towing position.

FIG. 2 is a side view thereof.

FIG. 3 is a side view of the system as converted into a lift.

FIG. 4 is a top view of the system as shown in FIG. 3.

Figure 5:
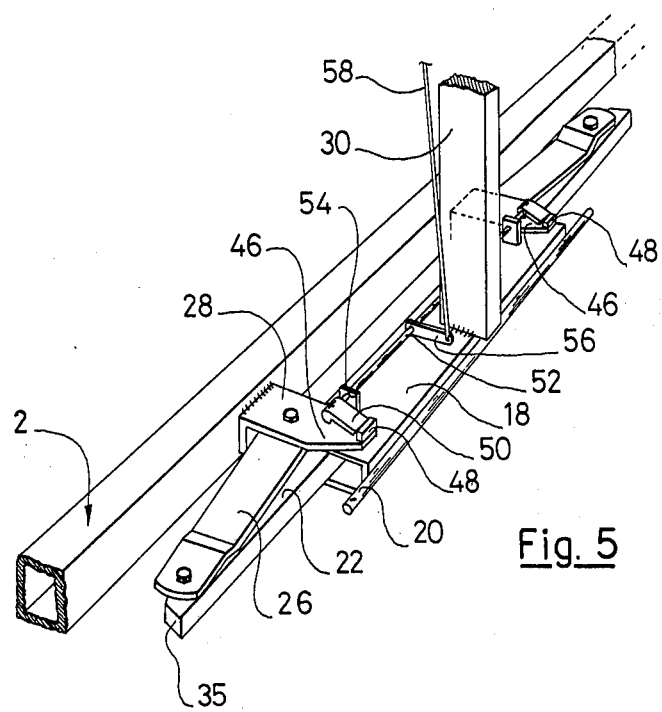
FIG. 5 is a detailed view of a modification of the system.

In FIG. 1 is shown a harrow 2, the frame of which is provided in a well known manner with a so-called "tower" 4 having at its upper end a hole system 6 adapted to hold a cross pin 8 as usable for hinging the harrow to the eye member 10 of the top rod 12 of a tractor lift system including two lift-arms 14, the free ends of which are conventionally-designed so as to have aligned cross holes 16 for receiving respective projecting coupling pin portions as normally provided on an implement adapted to be "lift-mounted" on a tractor.

However, in the implement and coupling system shown the harrow itself is not provided with such coupling pins, these in stead being provided on a traverse designated 18, the pins being designated 20. The traverse 18 belongs to a coupling system according to the invention, this system also comprising a pair of levers 22 hinged at respective points 24 to the traverse 18, the latter being rearwardly of open U-shaped cross section to the front end of an intermediate lever 26, the rear end of which is correspondingly hinged to a bracket 28 on the front portion of the frame of the harrow 2, the opposed brackets 28 being spaced somewhat, symetrically about the tower or post 4, generally with larger spacing than the distance between the front hinging points 24 of the levers 22.

On the traverse 18 is arranged a central upright or post 30 having at its top end a bracket portion 32 operable to get coupled to the eye member 10 of the top rod 12.

When the coupling pins 20 are mounted in the holes 16 of the lift arm ends and the system is used as otherwise shown in FIGS. 1 (and 2), the harrow 2 will, for obvious reasons, be towable behind a tractor in a trailer-like manner. The lateral spacing between the front hinge points 24 is small enough to be comparable with a single hinge point mounting of the levers 22 on the traverse 18, i.e. the mounting will correspond to a traction bar of the implement being pivoted to a towing pin or eye of the tractor; in practice the two levers 22 might well be pivoted to one central point (24) of the traverse 18.

The intermediate levers 26 are of U-shaped cross section their open sides facing each other, and they are each provided with an abutment portion 34 cooperating with a stepped end portion 35 of the respective end of the lever 22 so as to make each lever system 22, 26 a knee link being bent slightly outwardly even when transferring a towing force to the harrow 2.

Therefore, when the tractor is stopped and then driven rearwardly each of the knee links 22, 26 will be folded outwardly, as indicated in dotted lines in FIG. 1, and the length dimensions of the respective levers 22 and 26 as well as the spacing between the hinge points 24 and between the brackets 28 are chosen so as to enable a complete folding together of the levers 22 and 26 by the rearward movement of the tractor, whereby—as shown in FIGS. 3 and 4—the rear end portions of the levers 22 are received between the top and bottom flanges of the intermediate levers 26, while the traverse 18 is brought closely up against the front ends of the brackets 28.

On the post 30 is mounted a rearwardly projecting hook member 36 which, at the end of the rearward driving of the tractor, automatically engages the cross pin 8 of the tower or post 4 so as to couple these parts together when the lever system 22, 26 has reached its position as shown in FIGS. 3 and 4.

Hereafter the harrow 2 will be coupled to the tractor in a "lift mounted" manner, because the folded lever system 22, 26 in conjunction with its vertical engagement with the brackets 28 and with the traverse 18 will be able to transfer vertical forces between the traverse 18 (as lifted by the lift arms 14) and the harrow brackets 28, while the top connection through the hook 36 provides for the necessary upper horizontal transfer of a pulling force operable to hold the harrow 2 in a substantially horizontal position during the lifting thereof, the harrow to this end being provided with an inclined traction connection 38 between the top of the post 4 and the rear end of the harrow frame.

As shown on FIG. 3 the hook member 36 is connected with a wire 40 which, in a manner not shown, leads to the drivers— position in the tractor, such that the driver by pulling the said wire 40, may release the hook 36 from its engagement with the cross pin 8. When thereafter the tractor is driven forwardly the front structure 18, 30 of the coupling system will follow the tractor while the harrow is left behind; the lever system 22,26 will unfold until the rear stepped ends of the levers 22 engage the abutments 34 of the levers 26, and then the towing connection has been reestablished.

It will be appreciated that the operator can very easily change between towing coupling and lift coupling, according to the requirements.

In the lift coupling situation it may be desirable to lock together the traverse 18 and the harrow in the driving direction in order to have the pulling force transferred in a direct manner from the lift arm ends 14, 16 to the harrow frame. Such a locking is of course achievable in any of a row of various manners e.g. including snap locking arrangements. FIG. 1 illustrates by example a locking system comprising a lever 42 rigidly secured to each of the levers 26 so as to project inwardly from the rear end of the respective lever 26. When the lever system 22,26 is folded together each lever 42 will be pivoted into a forwardly projecting position, the levers 42 being vertically offset so as to not interfere with the levers 22. In their forwardly protruding positions the front ends of the levers 42 will be located just above or beneath the traverse 18, and a hole in each of said front ends may register with a vertical hole 44 in the traverse 18, whereby the parts are easily locked together by means of coupling pins through the said holes.

In a preferred embodiment as shown in FIG. 5 the brackets 28 are extended forwardly by a front portion 46, so as to engage over the traverse 18 in the lift mounted position, and the top front end of each bracket is provided with an upright nose portion 48 which, when the traverse and the implement are moved against each other, passes under an upper pivot lock pawl 50 mounted on a shaft 52 extending along the traverse, spaced thereabove by means of bearing posts 54 on the traverse, such that the pawls 50 will automatically lock the brackets 28 against retraction. The pawl shaft 52 is provided with a radial arm 56 connected with an extension 58 of the release cable as indicated in FIG. 3, whereby a pull in this cable will release the hook 36 as well as the pawls 50, and the tractor may then be driven forwardly for establishing the towing position of the coupling. Thus, the lift locking of the implement can be automatic, and the release of the locking can be easily effected by remote control from the drivers— seat.

When both the lift connection and the traction connection are thus established in a low level adjacent the front end of the harrow frame the post 30 on the traverse 18 will mainly serve the purpose of supporting the top bracket 32 and the hook 36 in convenient height positions for the respective engagement with the top rod eye member 10 and the top of the tower or post 4 of the harrow. Principally, therefore, the post 30 is not strictly necessary if in operation it is accepted that the top rod member 10 should be coupled to the top of the post 4 in a direct manner, by means of a cross pin or otherwise. The hook member 36 may even be mounted in direct connection with the top rod structure (or invertedly in connection with the top end of the post 4).

Normally agricultural implements are preadapted either for towing or for lift mounting, in the latter case either for full-lifting or semi-lifting, i.e. lifting of the implement front end while a rear part of the implement is caused to be wheel supported. However, lift mountable implements of both types are provided with standard coupling parts adapted for direct connection with the holes 16 of the lift arm ends as shown at 60 in FIG.

Figure 6:
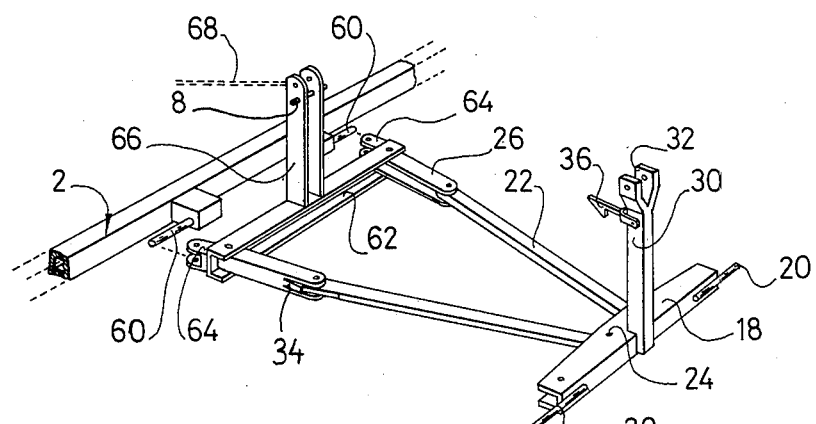
FIG. 6 is a perspective view of a modified embodiment of the invention

6, while with the invention these connector parts are constituted by the opposite ends 20 of the traverse 18. Now, it will of course be possible-and within the scope of the invention-to arrange for the levers 26 to be arranged in the required pivotal connection with the said standard coupling parts instead of the special brackets 28, e.g. with the use of another traverse 62, FIG. 6 provided at the rear end of the lever system 22,26 and having means 64 for its fixed connection with the said standard coupling parts 60. For an implement of the full-lifting type the standard tower or post 4 may still be used as described above, but in case it is not readily usable in the improved system for cooperation with the hook 36 it would be possible to additionally arrange for a separate post 66 on the said rear traverse 62 (whether or not the corresponding front post 30 is used). In this manner even a towing implement having no tower 4 may be converted or adapted to the requirements of this invention when the top of such an additional rear post 66 is connected with a rear portion of the implement by means of a pull connection 68 similar to the element 38.

Thus, the present invention comprises an implement (of any type) as provided with the lever system 22,26 as well as a separate coupling system comprising the lever system 22,26 and including means for its being coupled to an implement adjacent to the front end of the system.

Moreover, the lever system 22,26 may be modified to a large degree within the scope of the invention, since its basic ability to establish a towing connection when stretched out and to get shortened and establish a lift connection in response to the tractor being driven rearwardly will be achievable in many different manners, e.g. with the use of a simple telescopic connection system between the implement and the tractor; by the pushing together of such a system it will be perfectly possible to make one or more elements receivable in a space behind the front end of the implement itself. Principally even a wire connection between the implement and the lift arm ends will be usable, whereby the wire is bendable (or rolled onto a drum) when the tractor is driven rearwardly to establish a lift connection between the traverse 18 and the front end of the implement.

It should be emphasized that in the drawing the harrow 2 is shown as an example only; the invention may of course apply to any relevant type of implement as usable behind a tractor.

I claim:

1. A traction coupling for coupling a tractor of the tractor lift fitted type with an implement such as a cultivator propelled by the tractor, comprising a traverse constructed for mounting between opposed ends of lift arms of the tractor lift and a towing member projecting rearwardly from the traverse and constructed for connecting with the implement, characterized in that the towing member is pivotally connected to the traverse and is adjustable in length in such a manner that the coupling, by adjustment of the length of the towing member and without disconnection of the towing member or an end thereof, is shiftable between a towing position, in which the towing member is extended rearwardly relative to the traverse and an articulated coupling is obtained, and a lift mounted position, in which the towing member is contracted relative to the traverse and a relatively rigid coupling is achieved so that a front end of the implement, in use, is located adjacent the traverse in traction and lifting engagement therewith.

2. A traction coupling according to claim 1, comprising locking means being provided for enabling the coupling to be manually or automatically locked in said lift mounted position.

3. A traction coupling according to claim 1, wherein the traverse is provided with a post having upper coupling means for connection with a top rod of a tractor lift system, and a tower is provided that is mounted or mountable to a front end of the implement and has an upper coupler part that is releasably connectable with said upper coupling means by manual or automatic actuation locking means when said tower and said traverse are moved towards each other for establishment of said lift mounted position which is achieved, in use, by movement of said tractor toward said implement.

4. A traction coupling according to claim 2 or 3, characterized in that said locking means is actuatable or releasable from a tractor driver's position.

5. A traction coupling according to claim 3, wherein said tower is mounted to a front end of the implement and the towing member is pivotally connected at one end to said traverse and is connected at an opposite end to said front end of the implement.

6. A traction coupling according to claim 3, wherein said tower is mounted upon a second traverse that is connectable to coupling parts of the implement, and the towing member is pivotally connected at one end to the traverse for mounting to said tractor lift and is connected at an opposite end to said second traverse.

7. A traction coupling according to claim 1, in which the towing member is shaped substantially as a traction triangle, characterized in that said traction triangle has traction rods made as outwardly bendable elements, each element being made of parts that are foldable together in a laterally projecting position for enabling the triangle to assume the lift mounting position.

8. A traction coupling according to claim 7, characterized in that the traction rods, in the towing position, extend in a slightly outwardly bent manner, stop means being provided for preventing a straightening out of the rods.

9. A traction coupling according to claim 7, characterized in that parts of the traction rods are shaped so as to widely overlap and engage each other laterally by the total folding together of the respective rods in the lift mounting position.

10. A traction coupling according to claim 9, characterized in that the traction rods are shaped so as to be in carrying engagement when folded together, with the traverse such that they form intermediate carrier elements between said traverse and said implement.

11. A traction coupling according to claim 7, wherein the traverse is provided with a post having upper coupling means for connection with a top rod of a tractor lift system, and a tower is provided that is mounted or mountable to a front end of the implement and has an upper coupler part that is releasably connectable with said upper coupling means by manual or automatic actuation locking means when said towing member and said traverse are moved towards each other for establishment of said lift mounted position which is achieved, in use, by movement of said tractor toward said implement.

12. A traction coupling according to claim 11, wherein respective ends of said traction rods are pivotally connected to a front end of the implement and said traverse, and wherein said tower is mounted upon said front end of the implement.

13. A traction coupling according to claim 11, wherein respective ends of said traction rods are pivotally connected to said traverse for mounting to said tractor lift and to a second traverse mountable to coupling parts of the implement, and wherein said tower is mounted on the second traverse.

14. A traction coupling according to claim 12 or 5, comprising further locking means fixedly interconnecting said traverse with the front end of said implement.

15. A traction coupling according to claim 7 or 11, comprising further locking means for fixedly interconnecting said towing member with said traverse.

* * * * *